(12) United States Patent
LaBruno et al.

(10) Patent No.: US 7,455,517 B2
(45) Date of Patent: Nov. 25, 2008

(54) APPARATUS FOR PROPORTIONING MEAT PRODUCT FOR PACKAGING

(75) Inventors: Ronald F. LaBruno, Mount Prospect, IL (US); Douglas Conerton, Bourbonnais, IL (US); Neil Hayden, Braidwood, IL (US)

(73) Assignee: Formax, Inc., Mokena, IL (US)

( * ) Notice: Subject to any disclaimer, the term of this patent is extended or adjusted under 35 U.S.C. 154(b) by 0 days.

(21) Appl. No.: 11/788,758

(22) Filed: Apr. 20, 2007

(65) Prior Publication Data

US 2008/0260885 A1    Oct. 23, 2008

(51) Int. Cl.
*A22C 7/00*    (2006.01)

(52) U.S. Cl. .................. 425/573; 426/512; 426/513; 264/328.8; 264/328.12; 425/572

(58) Field of Classification Search .................. 425/572, 425/573; 264/328.8, 328.12; 426/512, 513
See application file for complete search history.

(56) References Cited

U.S. PATENT DOCUMENTS

| | | | |
|---|---|---|---|
| 3,887,964 | A | 6/1975 | Richards |
| 4,054,967 | A | 10/1977 | Sandberg et al. |
| 4,182,003 | A | 1/1980 | Lamartino et al. |
| 4,641,487 | A * | 2/1987 | Darecchio .................. 53/435 |
| 4,821,376 | A | 4/1989 | Sandberg |
| 6,351,927 | B1 | 3/2002 | Righele et al. |
| 6,416,314 | B1 | 7/2002 | LaBruno |
| 6,749,421 | B2 | 6/2004 | Sandberg |
| 7,014,456 | B1 * | 3/2006 | Tournour et al. ............ 425/572 |
| 7,255,554 | B2 | 8/2007 | Lamartino et al. |
| 2005/0092187 | A1 | 5/2005 | Lamartino et al. |

* cited by examiner

*Primary Examiner*—Yogendra Gupta
*Assistant Examiner*—Maria Veronica D Ewald
(74) *Attorney, Agent, or Firm*—The Law Office of Randall T. Erickson, P.C.

(57) ABSTRACT

A food patty molding machine has a reciprocating mold plate. A moldable food product is pumped through a fill passage into a cavity of the mold plate when the mold plate is in its fill position. A fill plate, interposed in the fill passage immediately adjacent the mold plate, has a multiplicity of fill apertures distributed in a predetermined pattern throughout an area aligned with the mold cavity when the mold plate is in its fill position. A fill block is fixed to the fill plate and includes a plurality of inverted L-shaped passages corresponding one-for-one with the fill apertures. The mold plate includes a longitudinal slot to accommodate relative longitudinal movement between the mold plate and the stationary fill block. The mold plate includes a transverse slot open into the longitudinal slot that defines the molding cavity. Loose ground meat can be filled in a horizontal direction into the cavity to provide a customary appearance to the packaged ground meat.

24 Claims, 9 Drawing Sheets

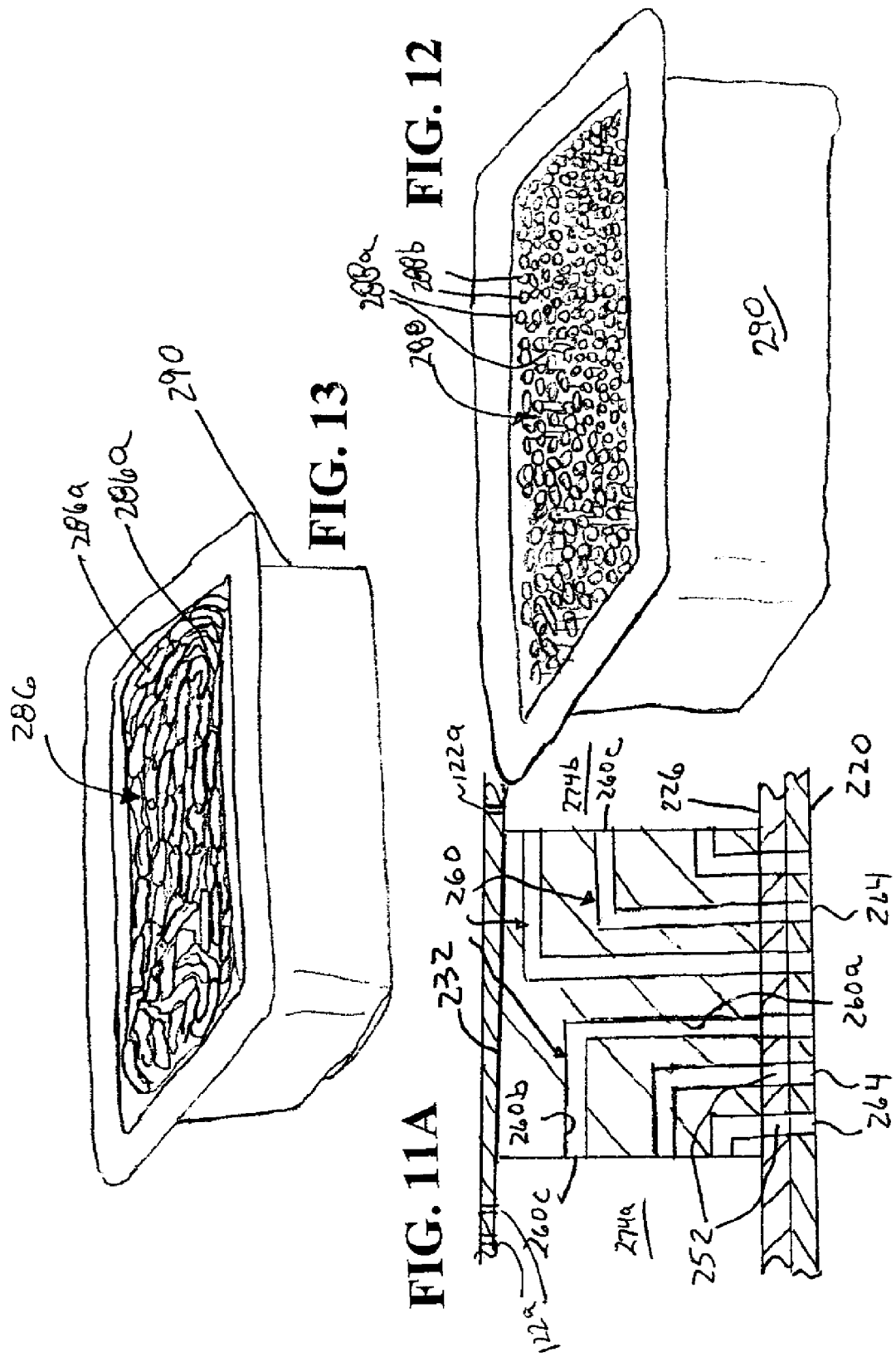

APPARATUS FOR PROPORTIONING MEAT PRODUCT FOR PACKAGING

BACKGROUND OF THE INVENTION

The present invention relates to a portioning device which generates metered portions of food product. More specifically, the invention relates to an improved metered filling of trays or similar containers with food product to be conveyed to a packaging unit.

U.S. Pat. No. 6,351,927 describes a single belt conveyor for conveying ground meat in an elongated bar from an extrusion plate of a grinder. The ground meat bar is transported beneath a shear-like cutting blade which cuts metered portions or blocks from the bar and delivers the portions to fill successively presented trays. The type of system generally described in this patent is currently a conventional system for filling trays with ground beef product.

According to some known systems, these blocks of stranded ground meat are placed into trays and overwrapped or MAP sealed. Because of the method of production, the blocks of meat have extruded strands elongated horizontally given the orientation of the extrusion plate and the conveyor. The packaged blocks are sold in retail outlets to consumers. Consumers recognize this appearance of the ground meat, viewed through the top film of the packaging, with horizontal strands, as being common or conventional.

One drawback to this proportioning method is that a variable block weight of +/−5% is common.

The present inventors have recognized that it would be desirable to provide a proportioning apparatus which produced proportioned blocks of a higher weight consistency and which is capable of operating at a high rate of speed. The present inventors have recognized the desirability of providing a proportioning apparatus that also filled packaging trays with the meat product having a conventional, horizontal strand appearance.

SUMMARY OF THE INVENTION

The invention provides a food product proportioning apparatus that proportions food product into blocks with a high degree of weight accuracy. According to one preferred embodiment, the apparatus of the invention presents blocks with a conventional appearance. In the case of a stranded meat product, the formed blocks have strands oriented substantially horizontally, in a conventional appearance.

The invention provides a food product proportioning apparatus, comprising: a mold plate, a mold plate drive, a food pump, ands a fill passage. The mold plate has at least one mold cavity with an open side therein. The mold plate drive drives the mold plate along a given path, in a repetitive cycle, between a fill position and a discharge position. The food pump pumps a moldable food product. The fill passage flow-connects the food pump to the mold cavity through the open side when the mold plate is in its fill position.

A fill block can be arranged in communication with the fill passage. The fill block has a multiplicity of fill paths through the fill block and distributed in a predetermined pattern throughout an area aligned with the mold cavity when the mold plate is in its fill position. The fill paths have a change in direction of about 90 degrees to fill through an open side face of the mold cavity when the mold plate is in its fill position.

Preferably the mold plate includes two mold cavities, each mold cavity having an open side face. Preferably, the side faces are closest to a centerline of the mold plate. A block-accommodating slot is elongated longitudinally in the mold plate and is open into the open side faces of the mold cavities. In operation, the fill block is located within the block-accommodating slot and relatively translates through the slot as the mold plate reciprocates. The block has fill paths that are open to each side of the block-accommodating slot to fill both mold cavities through the respective open side faces of the mold cavities when the mold plate is in the fill position. The fill paths each have a change in direction of about 90 degrees to fill through a side face of the mold plate when the mold plate is in its fill position.

A stripper plate can be interposed in the fill passage adjacent the face of the fill block opposite the mold plate. The stripper plate is movable along a path transverse to the mold plate path between a fill location and a discharge location. The stripper plate has a multiplicity of fill openings aligned one-for-one with the fill paths of the fill block as extensions thereof when the stripper plate is in its fill location. A stripper plate drive means is synchronized with the mold plate drive means, for moving the stripper plate between its fill location and its discharge location. The spacing between fill openings in the stripper plate, in the direction of the stripper plate path, is such that movement of the stripper plate to its discharge location seals off the fill openings. The stripper plate drive means moves the stripper plate to its discharge location, in each mold cycle, before the mold cavity moves appreciably away from its fill position toward its discharge position. The stripper plate drive means maintains the stripper plate in its discharge location while the mold plate moves toward its discharge position at least until the mold cavity is displaced beyond the fill apertures.

The invention provides a method of proportioning loose ground food products into saleable portions comprising the steps of: pumping ground food product into a mold cavity of a reciprocating mold plate patty forming machine and displacing the ground food product as a block out of the cavity, placing the block into a tray and covering the tray with a transparent film. The method can also include the step of providing that the mold plate is a thick mold plate composed of a polymer. The method can also include the step of filling the cavity with pumped food product though an open side of the cavity. The method can also include the step of filling the cavity with pumped food product though an open side of the cavity by way of a multi-path fill block to achieve a stranded food product appearance in the block.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 11A is a sectional view taken generally along line 11A-11A of FIG. 11;

FIG. 12 is a perspective view of a package filled with ground beef by a patty-forming machine having a vertical fill; and FIG. 13 is a perspective view of a package filled with ground beef by a patty forming machine having a horizontal side fill.

DESCRIPTION OF THE PREFERRED EMBODIMENT

Figure 1:
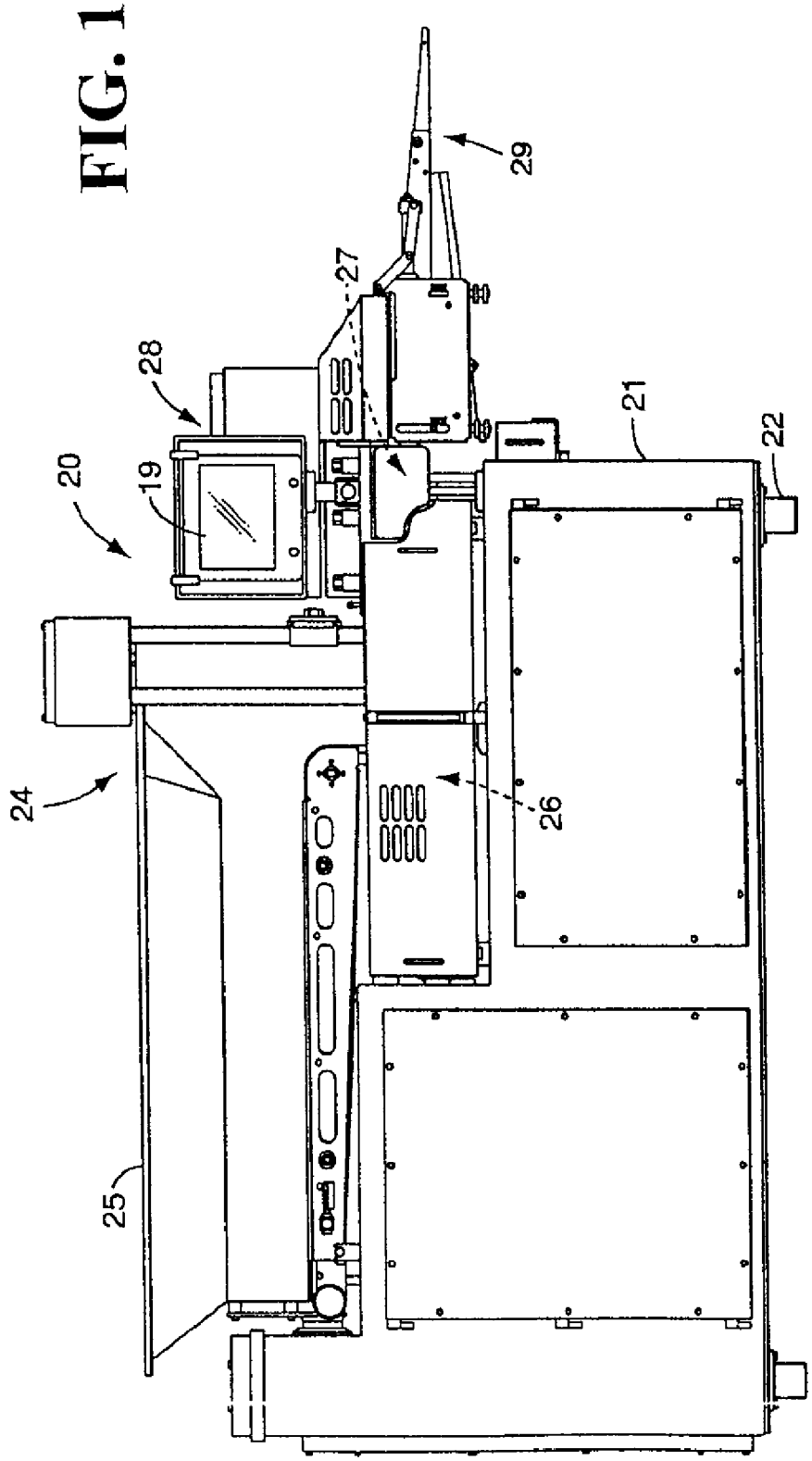
FIG. 1 is an elevational view of a patty forming apparatus.

While this invention is susceptible of embodiment in many different forms, there is shown in the drawings and will herein be described in detail preferred features of the invention. It will be understood, however, that the present disclosure is to be considered as an exemplification of the principles of the invention and is not intended to limit the invention to the specific form of the combination of features that are illustrated and described.

Food patties of various kinds, including hamburgers, molded "steaks", fish cakes, chicken patties, pork patties, potato patties, and others, are frequently formed in high-volume automated molding machines.

FIG. 1 illustrates a high volume food patty molding machine 20 of the type described in detail in published U.S. Patent Application 2005/0092187, U.S. Ser. No. 10/942,627 filed Sep. 16, 2004, herein incorporated by reference. Patty molding machines are also described in U.S. Pat. Nos. 3,887,964; 4,054,967; and 4,182,003, all herein incorporated by reference.

The food patty-forming apparatus can also be generally configured as a FORMAX®, MAXUM700®, F-6™, F-12™, F-19™, F-26™, or F400™ reciprocating mold plate forming machine, available from Formax, Inc. of Mokena, Ill., U.S.A.

Molding machine 20 includes a machine base 21 which supports the operating mechanisms of the machine and contains hydraulic actuating systems, electrical actuating systems, and most of the machine controls.

The food patty molding machine 20 includes a supply mechanism 24 for storing and supplying a moldable food product, such as ground beef, fish, pork, chicken, potatoes, or the like, to the processing mechanisms of the machine. Supply means 24 includes a large food product storage hopper 25 that supplies food product to a food pump system 26. System 26 includes two food pumps operating in alternation or may have more than two food pumps; other machines typically include only a single food pump. The two food pumps continuously pump food, under pressure, into a valve manifold 27 connected to a cyclically operable molding station 28.

Figure 2:
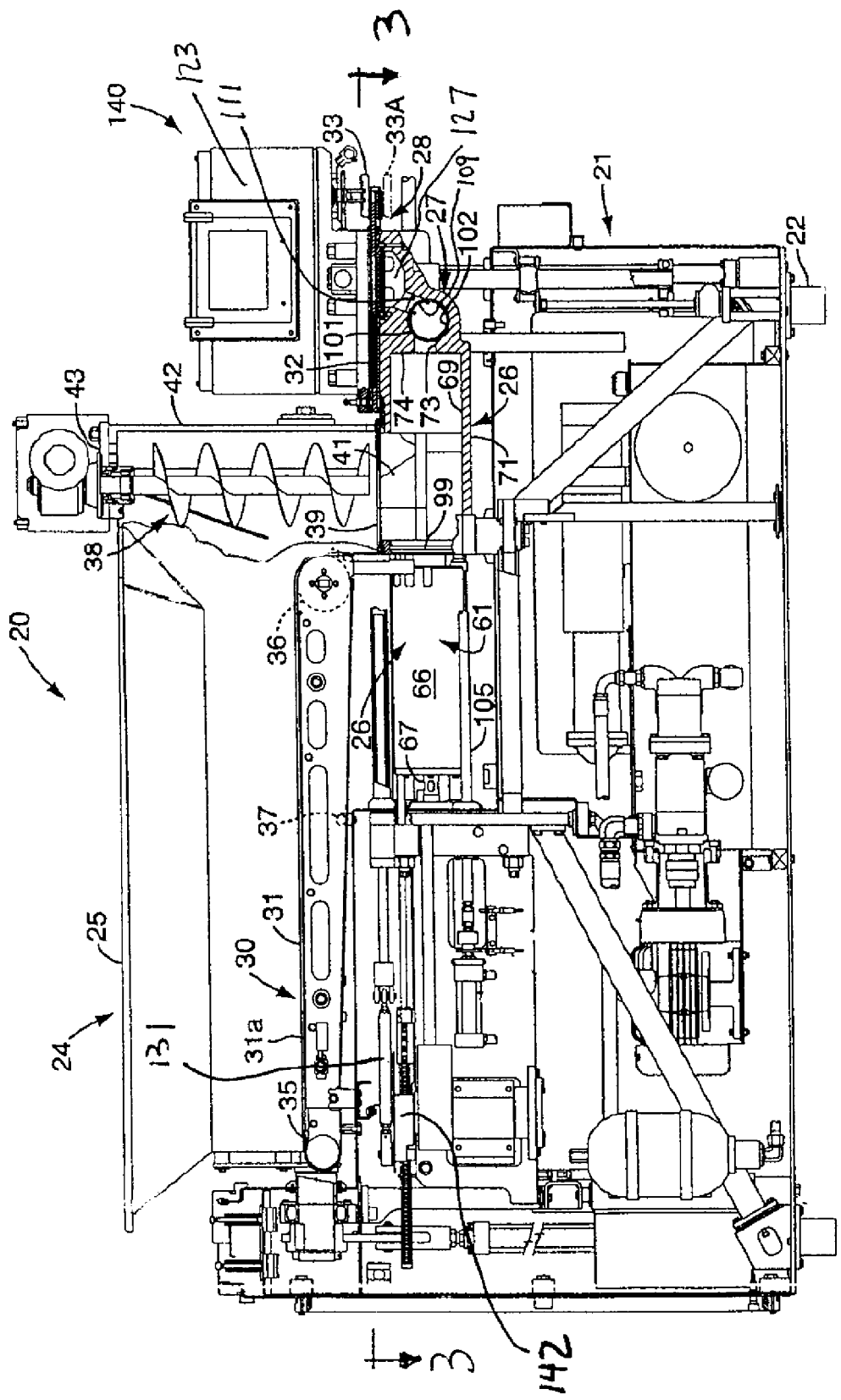
FIG. 2 is a fragmentary sectional view of the patty forming apparatus of FIG. 1.

As illustrated in FIG. 2, molding station 28 includes a mold plate 32 that moves cyclically between a fill position, shown in FIG. 1 and a discharge position in which its mold cavities are outside of station 28, aligned with a set of knock-out cups 33.

Food supply means 24 includes a conveyor belt 31 that extends completely across the bottom of hopper 25. The forward end of hopper 25 communicates with a vertical hopper outlet 39 that leads downwardly into two pump chambers; only one pump chamber 41 is shown. One or more feed screws 38 are driven in rotation to deliver food product through the outlet 39 to the pump chamber 41. The conveyor belt 31 is driven in circulation to deliver food product in the hopper 25 to the feed screw 38.

Figure 3:
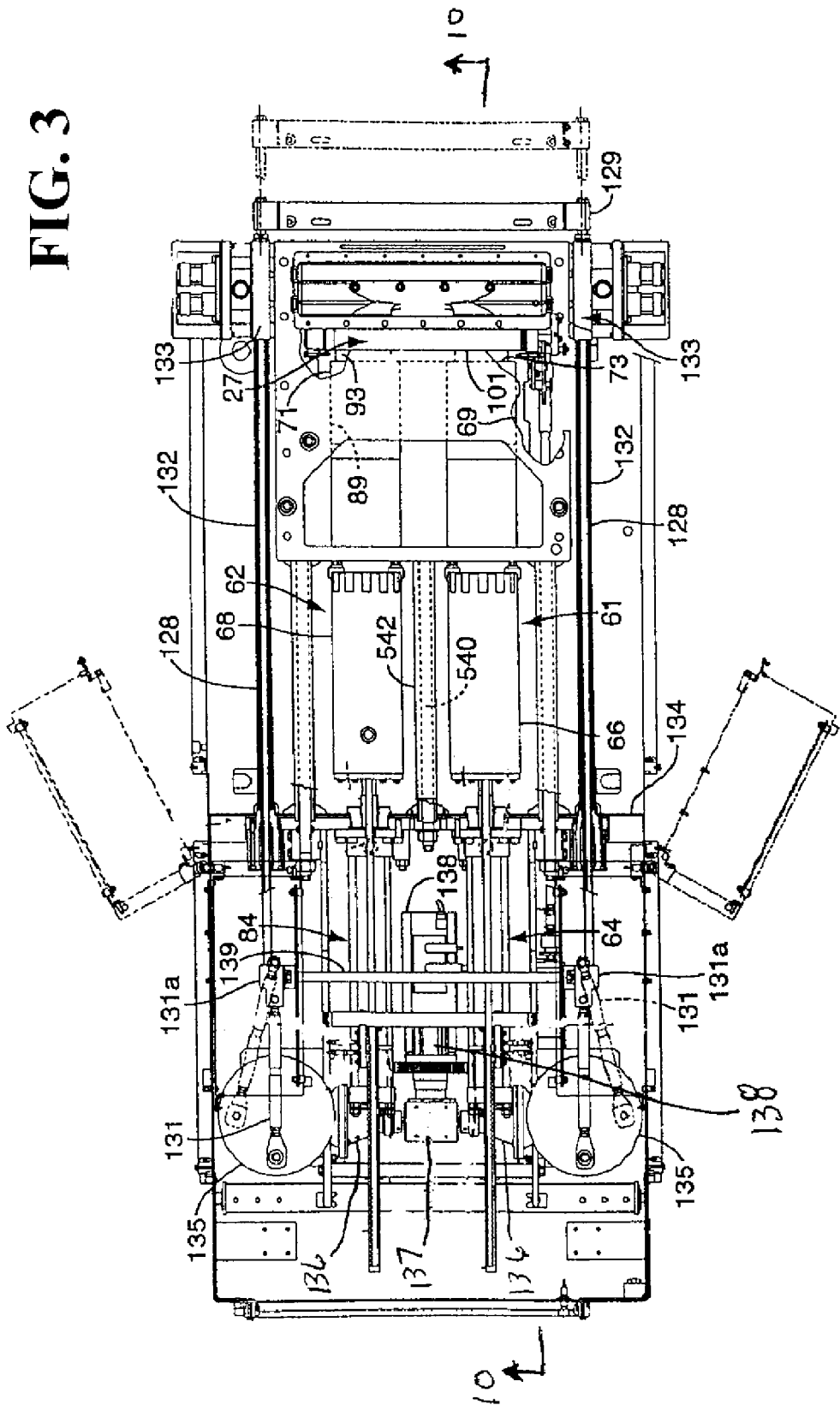
FIG. 3 is a sectional view taken generally along line 3-3 of FIG. 2.

As illustrated in FIG. 3, the food pump system 26 comprises two reciprocating food pumps 61, 62. Food pumps 61, 62 are driven by hydraulic cylinders 64, 84, respectively. The piston in each cylinder is connected to a piston rod that is in turn connected to a large pump plunger 66, 68 respectively. The respective plunger 66, 68 is aligned with and extends into a pump cavity 69, 89, which is substantially enclosed by a housing 71. The forward wall 74 of each pump cavity 69, 89 includes a respective slot 73, 93 that communicates with the valve manifold 27.

Valve feed manifold 27 includes a valve cylinder 101 fitted into an opening in housing 71 immediately beyond wall 74. Valve cylinder 101 includes two intake slots 107, 108. One slot 107, 108 is alignable with a corresponding outlet slot 73, 93 in pump cavity wall 74, depending on which pump 61, 62 is in use. Rotation of cylinder 101 is effective to move one slot 107, 108 into alignment and one slot 107, 108 out of alignment with corresponding slots 73, 93 depending on which pump is in operation and which is being refilled. Valve cylinder 101 also includes outlet slots 109 aligned with a slot 111 in housing 71 that comprises a fill passage for the molding station 28.

The mold plate 32 is connected to a transverse bar 129 shown in FIG. 3 that is connected to drive rods 128 that extend alongside housing 71. The other end of each drive rod 128 is pivotally connected to a connecting link 131 via a coupling plate 131a and a pivot connection. The connecting link 131 is shown in two positions (one solid, one dashed).

Each drive rod 128 is carried within a guide tube 132 that is fixed between a wall 134 and a front bearing housing 133. The connecting links 131 are each pivotally connected to a crank arm 142 (FIG. 2). The crank arm 142 is fixed to, and rotates with, a circular guard plate 135.

The crank arms 142 are each driven by a right angle gear box 136 via a "T" gear box 137 having one input that is driven by a precise position controlled motor 138 such as a servomotor, and two outputs connected to the gearboxes 136. The "T" gear box 137 and the right angle gear boxes 136 are configured such that the crank arms 142 rotate in opposite directions at the same rotary speed.

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached links 131 cancels, and separation force is taken up by tension in the tie bar 139.

During most of each cycle of operation of mold plate 32, the knockout mechanism remains in the elevated position, with knockout cups 33 clear of mold plate 32. When mold plate 32 reaches its extended discharge position the knockout cups 33 are driven downward to discharge the patties from the mold cavities.

By using a servo motor to drive the mold plate, the mold plate motion can be precisely controlled. The motion can have a fully programmable dwell, fill time, and advance and retract speeds.

The aforementioned apparatus is particularly effective at forming patties such as hamburger patties, for example hamburger patties having a thickness of about 0.5 inches.

According to the present invention, the patty-forming apparatus 20 is modified to form a thick food product block that can be packaged in a tray to be sold as a bulk food commodity at retail, for example, the food product block composed of ground beef sold in transparent plastic film covered trays in grocery stores. According to the present invention the block thickness can be about 2 inches thick for forming blocks that can be conveniently packaged in 1 pound, 1.5 pound, 2 pound, 2.5 pound, ½ kg or 1 kg packages of loose ground meat.

According to the preferred embodiment, the apparatus is modified to provide the food product block with strands or fibers oriented horizontally, in a conventional appearance. For example, for loose ground beef, the beef strands are formed with the strands oriented horizontally. Horizontal strands of loose ground beef covered by transparent plastic film provide a conventional appearance, recognized as such by consumers.

FIGS. 4-11A illustrate the modification in more detail. The aforementioned mold plate 32 is replaced by a thicker mold plate 202 (FIG. 5) having a thickness of about 2 inches. In order to accommodate the thicker mold plate 202 for the desired filling, modifications are made to the components which make up a food product fill passage 127 located between the valve manifold 27 and the mold plate 202.

Figure 4:
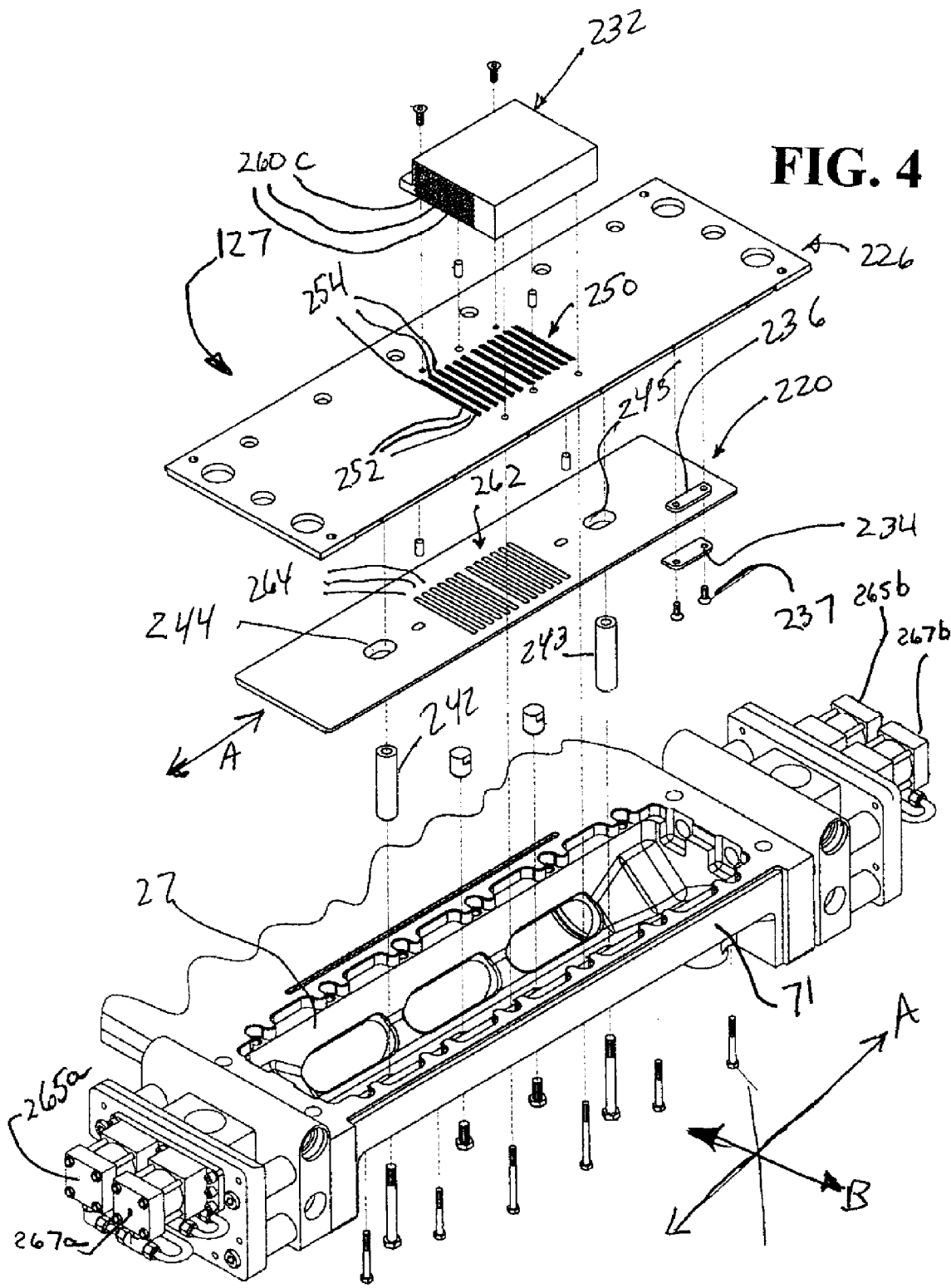
FIG. 4 is an exploded, fragmentary, perspective view of a portion of the apparatus shown in FIG. 2.

FIG. 4 illustrates the manifold 27, a stripper plate 220, a fill plate 226 and a fill block 232. The fill plate 226 fits over and is fastened to the housing 71 of the manifold 27. The stripper plate 220 is carried by the fill plate against a bottom surface thereof by guides 234 that underlie the stripper plate 220 and spacers 236 adjacent to the stripper plate that space the guides from the fill plate 226. Fasteners 237 penetrate through each guide 234/spacer 236 pair and fasten the pair to the fill plate 226. The spacers 236 and guides 234 allow the stripper plate 220 to slide against the fill plate 226 in a reciprocating, lateral direction A. Although one pair of guide 234/spacer 236 is shown, it is understood that two guide/spacer pairs would be arranged along each long side of the stripper plate 220

Cylindrical guides 242, 243 are fastened to the fill plate 226 and penetrate oblong slots 244, 245 and the stripper plate to guide movement of the stripper plate along the direction A.

The fill block 232 is fastened at a top of the fill plate 226. The fill plate 226 includes a rectangular field 250 of closely spaced apertures 252. The apertures 252 are arranged in spaced-apart columns 254 along a longitudinal direction, the direction "B" of reciprocation of the mold plate 220. The fill block 232 includes inverted L-shaped passages 260, each passage having a vertical portion 260a, and a horizontal portion 260b ending in an outlet opening 260c (FIG. 11A). Each passage 260 is in registry with one aperture 252 so that food product passes from each aperture 252 passes through the corresponding passage 260.

FIG. 11A illustrates in section the configuration of the fill block 232. In FIG. 11A, the size of the slots 264, apertures 252 and passages 260 is exaggerated, and the number of slots 264, apertures 252 and passages 260 shown is reduced for clarity of description. It should be understood that the slots 264, apertures 252 and passages 260 can be quite small and numerous as shown in FIG. 4.

The stripper plate 220 includes a slot area 262 that includes a plurality of slots 264 that correspond in number and location and size to the columns 254 of the fill plate apertures 252.

The stripper plate 220 reciprocates in the direction A between a fill position wherein each slot 264 is in registry with a column 254 of apertures 252 to allow flow through the apertures 252, and a seal-off position wherein solid portions of the stripper plate 220 between the slots 264 closes off the columns 254 of apertures 252. The functioning of the stripper plate and sealing of the apertures is more fully described in U.S. Pat. No. 4,821,376, herein incorporated by reference.

This patent describes the stripper plate having apertures (instead of slots) which correspond to the fill plate apertures. Either stripper plate apertures of U.S. Pat. No. 4,821,376 or the stripper plate slots described herein could be used.

A stripper plate drive comprises opposing pneumatic cylinders 265a, 265b, 267a, 267b that have extendable rods connected to or pressed against opposite ends of the stripper plate 220 and are selectively controlled to reciprocate the stripper plate in synchronism with movement of the mold plate 202. The stripper plate 220 is moved to its seal-off position, in each mold cycle, before the mold plate moves appreciably away from its fill position toward its discharge position, and then the stripper plate drive maintains the stripper plate in its discharge location while the mold plate moves toward its discharge position, at least until the mold cavities (described below) of the mold plate 202 are moved beyond the outlets 260c. A preferred timing for the movement of stripper plate 331 can be understood from U.S. Pat. No. 4,821,376.

Figure 5:
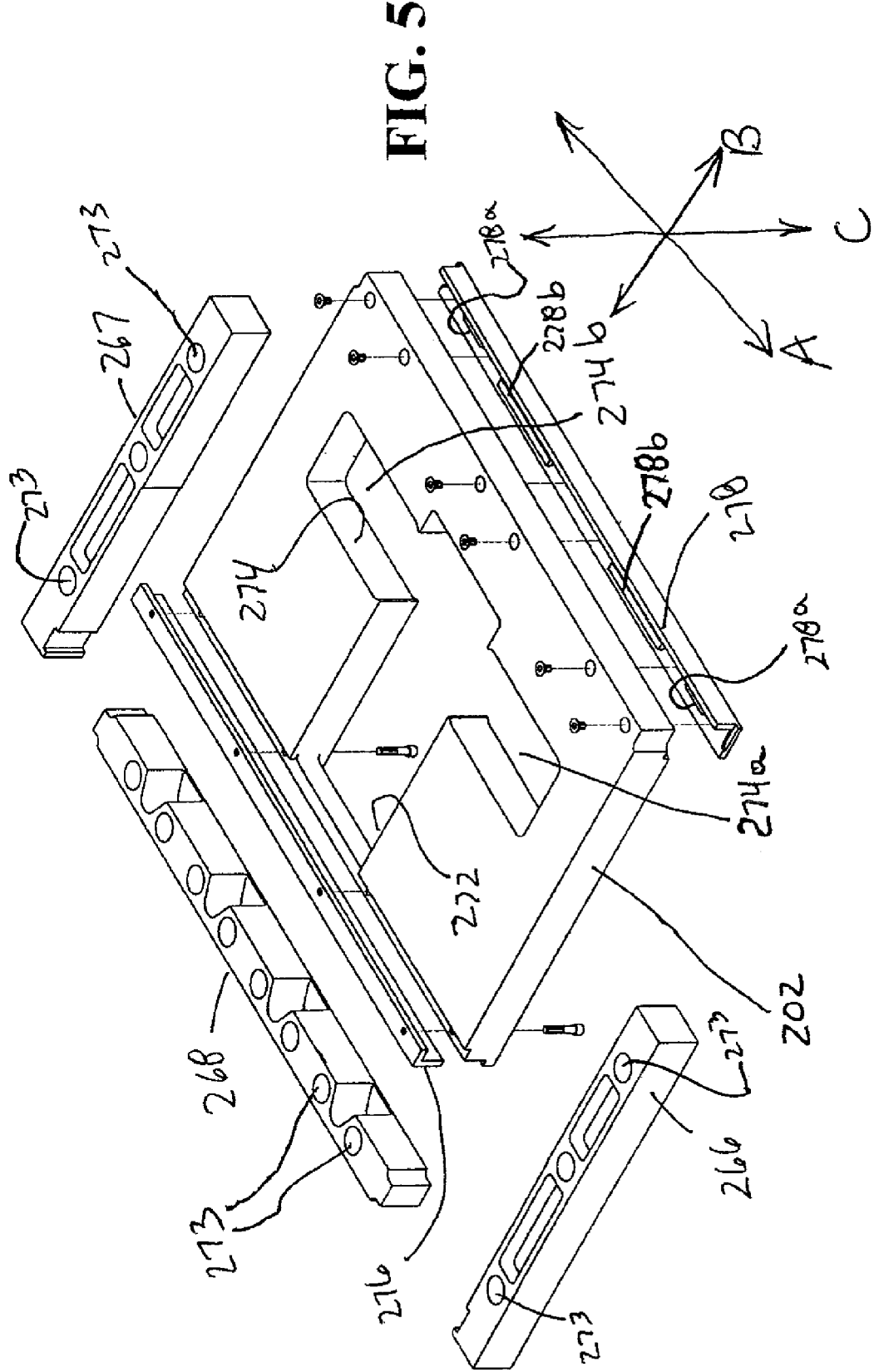
FIG. 5 is an exploded, fragmentary, perspective view of a further portion of the apparatus shown in FIG. 2.
Figure 10:
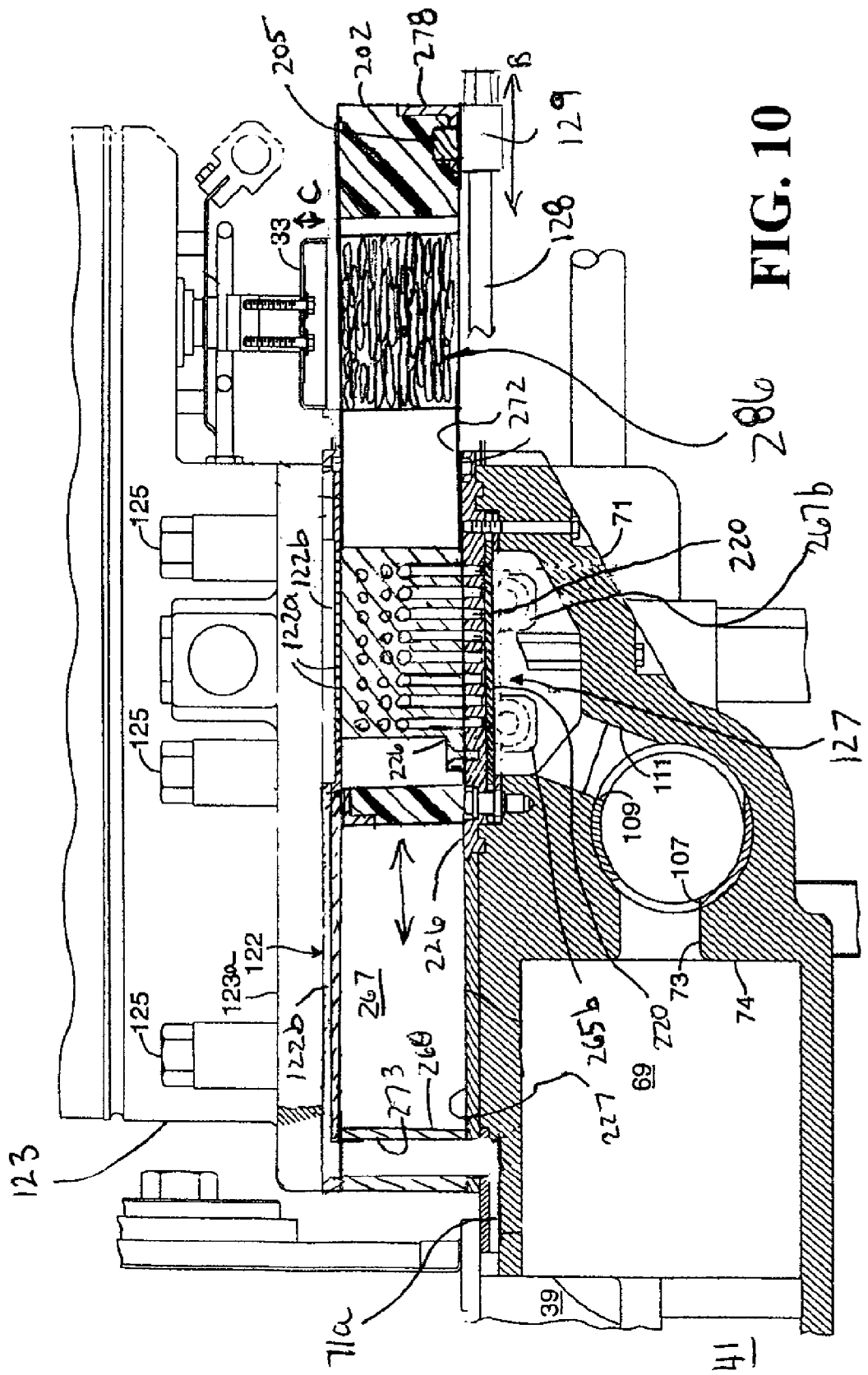
FIG. 10 is an enlarged, fragmentary sectional view taken generally along line 10-10 of FIG. 3 with the mold plate shown in a block discharge position.

FIG. 5 illustrates the mold plate 202 surrounded by side spacers 266, 267 and a rear spacer 268. The spacers 266, 267, 268 include holes 273 for fasteners to penetrate between the cover 122 and the housing 71 of the manifold 27. Some holes 273 in the rear spacer 268 can be used for channeling breather plate air and food product fines back to the pump chambers as shown in FIG. 10. The mold plate includes a longitudinal slot 272 intersecting a lateral slot 274, forming a "t" shape. To reduce the weight of the mold plate 202, it is composed of a polymer material such as Polybutylene Terephalate (PBT) or plastic material such as Cast Nylon such as NYCAST NYLOIL FG. The mold plate is reinforced at a rear edge by a first angle bracket 276 and at a front edge by a second angle bracket 278. The second angle bracket 278 is attached to the transverse drive bar 129 which is driven by the apparatus drive rods 128 (FIG. 3). The spacers 266, 267, 268 can be composed of bright nickel plated steel and the brackets 276, 278 can be composed of stainless steel.

Figures 6, 7, 8, 9:
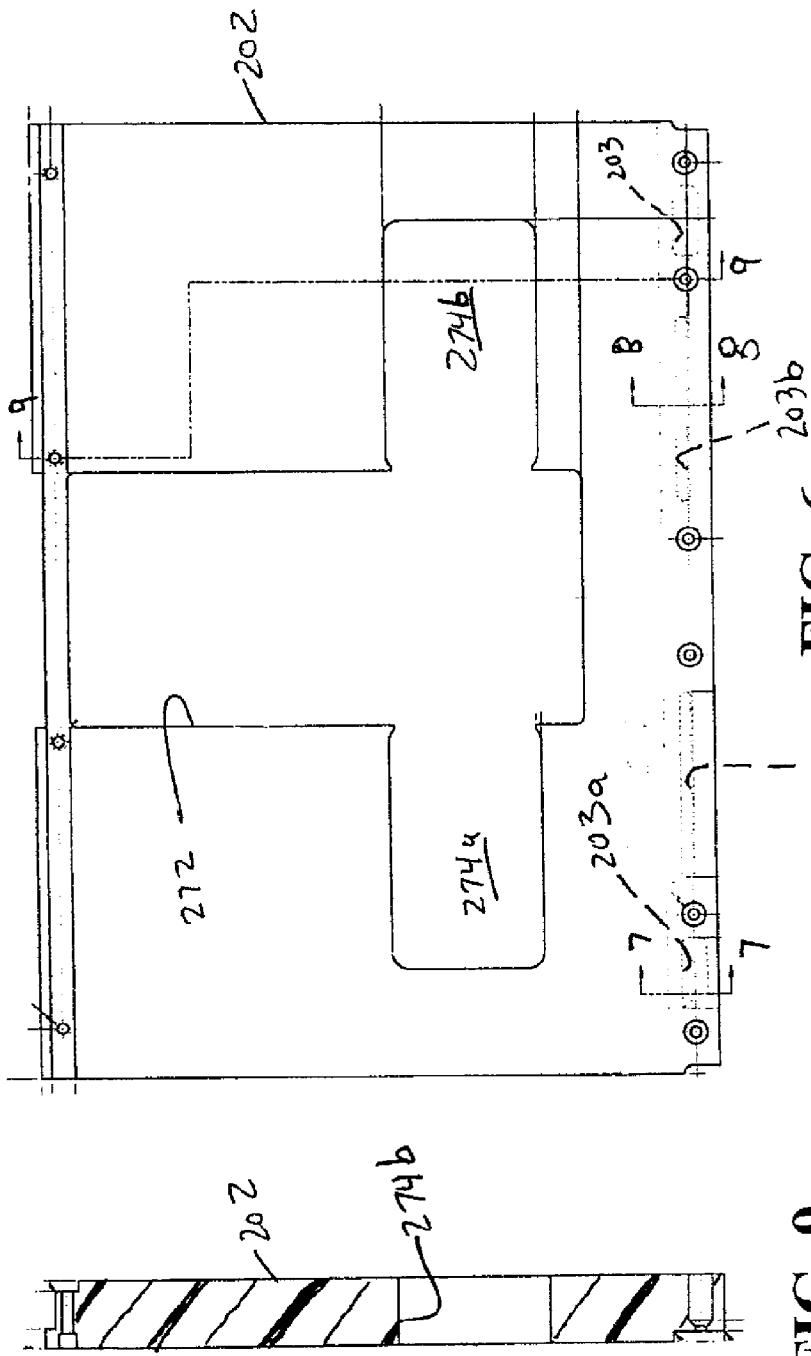
FIG. 6 is a plan view of a mold plate shown in FIG. 5.
FIG. 7 is a fragmentary sectional view taken generally along line 7-7 of FIG. 6.
FIG. 8 is a fragmentary sectional view taken generally along line 8-8 of FIG. 6.
FIG. 9 is a sectional view taken generally along line 9-9 of FIG. 6.

FIG. 5 illustrates that the front bracket 278 has two oblong openings 278a and FIGS. 6 and 7 illustrate that the mold plate 202 has two corresponding oblong recesses 203a. Each pair of opening 278a and corresponding recess 203a is configured to receive a key 205 (FIG. 10) to secure the mold plate to the transverse drive bar 129 which also has an oblong opening to receive the key 205. The keys 205 securely lock the mold plate 202 to the drive bar 129. The keys 205 are preferably composed of a high shear strength material such as a tool steel.

FIG. 5 also illustrates that the front bracket 278 includes raised ribs 278b and FIGS. 6 and 8 illustrate that the mold plate 202 includes corresponding recesses 203b for receiving the ribs 278b. The ribs 278b distribute reciprocating forces 278 between the bracket 278 and the mold plate 202.

The rear edge of bracket 276 is fastened to the mold plate 202 by fasteners penetrating the mold plate from below, and the front edge of bracket 278 is fastened by fasteners penetrating the mold plate 202 from above.

As illustrated in FIG. 10, the upper part of the pump housing 71 supports the mold plate 202. A mold cover 122 can be disposed above a breather plate 122a that overlies a mold plate 202, closing off the top of each of the mold cavities 274a, 274b. In alternate machine configurations the breather plate can be located below the mold plate, closing off a bottom of each of the mold cavities. The spacers 266, 267, 268 (FIG. 5) are provided to maintain the spacing between the cover 122 and the upper part of the pump housing just greater than a thickness of the mold plate 202. A housing 123 is positioned above the mold cover. Housing 123 encloses the operating mechanism (not shown) for knock-out cups 33.

The breather plate 122a can be of conventional design or such as disclosed in U.S. Pat. Nos. 6,749,421; 6,416,314; or published application US20050092187, all incorporated herein by reference, and includes apertures 122a in registry with the cavities 274a, 274b during filling in order to expel air that is displaced by the food product filling the cavities. The breather plate 122 includes one or more channels 122b in communication with the apertures 122a, and the housing 71 provides one or more channels 71a in communication with the channels 122b, for providing a flow path for air and food product fines to be recycled from the mold cavities 274a, 274b back to the pump chambers 41.

As best illustrated in FIG. 10, the upper surface of the housing 71 that encloses the pump cavities 69 and 89 and the manifold 27 carries a support plate or wear plate 227 and the fill plate 226 that forms a flat, smooth mold plate support surface. The mold support plate 227 and the fill plate 226 may be fabricated as two plates as shown, or a single plate bolted to or otherwise fixedly mounted upon housing 71.

A mold cover casting 123a is mounted over the mold cover 122. Cover 122 and mold cover casting 123a are fixed to the pump housing 71 by six mounting bolts, or nuts tightened on studs, 125.

When assembled, the fill block 232 fits within the long slot 272 of the mold plate 202. The fill block 232 is stationary but slides relatively through the slot 272 as the mold plate 202 is reciprocated along the direction B. When the mold plate is in the fill position (FIG. 11), passages, particularly the outlets 260c, are open into the opposite end rectangular areas of the lateral slot 274 which form mold cavities 274a, 274b (FIG. 5). Food product under pressure passes through the stripper plate slots 264, the fill plate apertures 252 into the fill block passages 260, out of the outlet openings 260c and into the mold cavities 274a, 274b of the mold plate 202 to form blocks 286. The mold plate 202 is then reciprocated forwardly toward its discharge position (FIG. 10) wherein knockout cups 33 reciprocate downward in the direction "C" to knock two formed blocks 286 from the cavities 274a, 274b onto the conveyor 29 (FIG. 1). The cups 33 correspond in shape to the cavities 274a, 274b, being slightly smaller to fit snugly into the cavities to displace the blocks 286. The blocks 286 are carried by the conveyor 29 (FIG. 1) to a packaging machine where they are deposited into trays or other receptacles and then can be covered with a clear plastic film or other cover.

Figure 11:
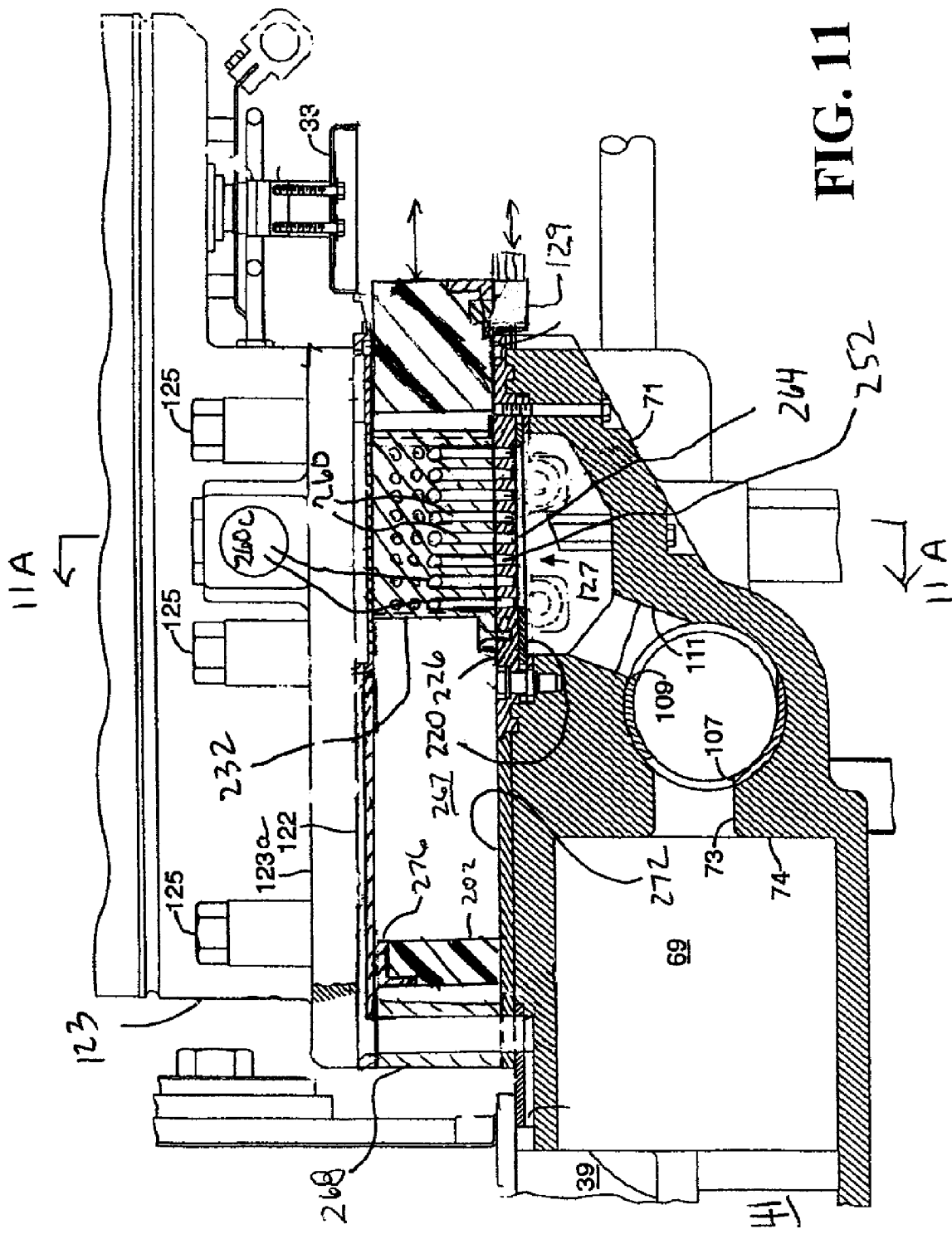
FIG. 11 is an enlarged, fragmentary sectional view taken generally along line 10-10 of FIG. 3 with the mold plate shown in a block filling position.

In FIGS. 10 and 11, the size of the slots 264, apertures 252 and passages 260 is exaggerated, and the number of slots 264, apertures 252 and passages 260 shown is reduced for clarity of description. It should be understood that the slots 264, apertures 252 and passages 260 can be quite small and numerous as shown in FIG. 4.

FIG. 12 illustrates the appearance of loose ground beef in a loose meat block 288 formed using a vertical fill through a horizontal perforated fill plate into mold plate cavities, such as disclosed in U.S. Pat. No. 4,821,376, without use of the direction-changing fill block 232. The meat block 288 is shown in a tray 290. Strands 288a formed by the perforated fill plate are oriented vertically with ends 288b of the strands being visible. Consumers are not accustomed to this appearance of ground beef sold in a tray packaging with strands oriented vertically.

Although a patty forming apparatus with a conventional top or bottom fill, without the side filling and without the fill block 232, is not the preferred form of the invention, in general, the proportioning of loose ground meat blocks using a patty forming apparatus with a thick mold plate is encompassed by the present invention. The use of the patty forming apparatus achieves portion control advantages not realized by the present conventional portion cutting apparatus. Therefore, even a conventional top or bottom fill without side filling in the mold plate, which results in the currently less desirable appearance of FIG. 12, is encompassed by the invention.

FIG. 13 shows the resultant conventional appearance using the apparatus illustrated in FIGS. 4-11 that allows for the filling of the cavities 274a, 274b horizontally through sides of the cavities. Strands 286a of loose meat block 286 are oriented horizontally in a conventional appearance.

From the foregoing, it will be understood that numerous variations and modifications may be effected without departing from the true spirit and scope of the novel concept of the invention. It is to be understood that no limitation with respect to the specific method, apparatus, and product illustrated herein is intended or should be inferred. It is, of course, intended to cover by the appended claims all such modifications as fall within the scope of the claims.

The invention claimed is:

1. A food product proportioning apparatus, comprising:
a mold plate having at least one mold cavity therein;
mold plate drive for driving the mold plate along a given path, in a repetitive cycle, between a fill position and a discharge position;
a food pump for pumping a moldable food product;
a fill passage flow-connecting the food pump to the mold cavity when the mold plate is in its fill position;
a fill block, interposed in the fill passage adjacent the mold plate, having a multiplicity of fill paths distributed in a predetermined pattern throughout an area aligned with the mold cavity when the mold plate is in its fill position, said fill paths each having a change in direction of about 90 degrees to fill through a side face of the mold cavity when the mold plate is in said fill position.

2. A food product proportioning apparatus according to claim 1, wherein said mold plate comprises two mold cavities and a fill block-accommodating slot located between said mold cavities, said fill block relatively slidably located within said slot and said fill paths each having a change in direction of about 90 degrees to fill through side faces of both said mold cavities when the mold plate is in said fill position.

3. A food product proportioning apparatus according to claim 2, comprising a fill plate, said fill block mounted to said fill plate, said fill plate having at least one opening to allow food product to pass between said fill passage and said fill block.

4. A food product proportioning apparatus according to claim 3, further comprising a stripper plate adjacent the mold plate, and movable along a path transverse to the mold plate path between a fill location and a discharge location, the stripper plate having a multiplicity of fill openings aligned one-for-one with the fill paths as extensions thereof when the stripper plate is in its fill location; and stripper plate drive means, synchronized with the mold plate drive means, for moving the stripper plate between its fill location and its discharge location, and wherein the spacings between fill openings in the stripper plate, in the direction of the stripper plate path, are such that movement of the stripper plate to its discharge location seals off the fill openings.

5. A food product proportioning apparatus according to claim 4, comprising a fill plate between said stripper plate and said fill block, said fill block mounted to said fill plate, said fill plate having at least one opening to allow food product to pass between said fill passage and said fill block.

6. A food product proportioning apparatus, comprising:
a mold plate having at least one mold cavity therein;
mold plate drive for driving the mold plate along a given path, in a repetitive cycle, between a fill position and a discharge position;
said mold cavity comprises an open side perpendicular to a bottom surface of said mold plate;
a food pump for pumping a moldable food product; and
a fill passage flow-connecting the food pump to the mold cavity through the open side when the mold plate is in its fill position.

7. A food product proportioning apparatus according to claim 6, comprising a fill block within said fill passage and having a multiplicity of fill paths distributed in a predetermined pattern throughout an area aligned with the open side of the mold cavity when the mold plate is in its fill position, said fill paths each having a change in direction of about 90 degrees to fill through said open side of the mold cavity when the mold plate is in said fill position.

8. A food product proportioning apparatus according to claim 6, wherein said mold plate comprises two mold cavities and a fill slot in communication with said fill passage, said fill slot located between said mold cavities, each said file mold cavity having an open side facing said fill slot to fill through said open sides of both said mold cavities when the mold plate is in said fill position.

9. A food product proportioning apparatus according to claim 8, comprising a stationary fill block within said fill slot, said fill block having a multiplicity of fill paths distributed in a predetermined pattern throughout an area aligned with the open sides of the mold cavities when the mold plate is in its fill position, said fill paths each having a change in direction of about 90 degrees to fill through the open sides of the mold cavities when the mold plate is in said fill position.

10. A food product proportioning apparatus according to claim 9, comprising a fill plate between said stripper plate and said fill block, said fill block mounted to said fill plate, said fill plate having at least one opening to allow food product to pass between said fill passage and said fill block.

11. Food product proportioning tooling for a forming machine, having a pressurized food product fill passage and a mold plate drive for reciprocating a mold plate between a fill position and a discharge position, comprising:
a mold plate having a fill opening configured to be in food product communication with the fill passage and having at least one mold cavity therein, said mold cavity having a side opening open to said fill opening, and said mold plate comprises at least one attachment point for connecting said mold plate to said mold plate drive.

12. A food product proportioning tooling according to claim 11, comprising a fill block, configured to be placed in said fill opening to be in food product communication with the fill passage, having a multiplicity of fill paths distributed in a predetermined pattern throughout an area aligned with the side opening of said mold cavity when the mold plate is in its fill position, said fill paths each having a change in direction of about 90 degrees to fill through said side opening of said mold cavity when said mold plate is in said fill position.

13. Food product proportioning tooling according to claim 12, wherein said mold plate comprises two mold cavities, said fill opening slot located between said mold cavities, each said mold cavity having a side opening to fill through said side openings of both said mold cavities when the mold plate is in said fill position.

14. Food product proportioning tooling according to claim 13, further comprising a fill plate, said fill block mounted to said fill plate, said fill plate having at least one opening to allow food product to pass between said fill passage and said fill block.

15. Food product proportioning tooling according to claim 14, further comprising a stripper plate configured to be movable along a path transverse to the mold plate path between a fill location and a discharge location, the stripper plate having a multiplicity of fill openings aligned one-for-one with the fill paths as extensions thereof when the stripper plate is in its fill location.

16. A food product forming apparatus, comprising:
a polymer mold plate having at least one mold cavity therein, said mold cavity having a side opening;
mold plate drive for reciprocally driving the mold plate, between a fill position and a discharge position;
a food pump for pumping a moldable food product into a fill passage;
a support plate and a cover plate, said mold plate slidably arranged between said support plate and said cover plate;
a fill path, in flow-communication with said fill passage, to fill food product through said side opening into said mold cavity when the mold plate is in said fill position.

17. A food product proportioning apparatus according to claim 16, wherein said mold plate comprises a longitudinal slot, open to said side opening, and said fill path comprises a fill block that extends from one of said support plate and said cover plate into said slot.

18. A food product proportioning apparatus according to claim 17, wherein said fill block has a multiplicity of fill pathways distributed in a predetermined pattern throughout an area aligned with the side opening when the mold plate is in its fill position, said fill pathways having a change in direction of about 90 degrees to fill through said side opening of the mold cavity when the mold plate is in said fill position.

19. A food product proportioning apparatus according to claim 18, wherein said mold plate comprises two mold cavities, each having top and bottom open faces and a side opening, and said slot is located between said mold cavities open into each said side opening, and said fill pathways having a change in direction of about 90 degrees to fill through said side openings of both said mold cavities when the mold plate is in said fill position.

20. A food product proportioning apparatus according to claim 6, wherein said mold cavity of said mold plate comprises an open top and an open bottom.

21. A food product proportioning apparatus according to claim 20, comprising a fill block within said fill passage and having a multiplicity of fill paths distributed in a predetermined pattern throughout an area aligned with the open side of the mold cavity when the mold plate is in its fill position, said fill paths each having a change in direction of about 90 degrees to fill through said open side of the mold cavity when the mold plate is in said fill position.

22. A food product proportioning apparatus according to claim 20, wherein said mold plate comprises two mold cavities and a fill slot in communication with said fill passage, said fill slot located between said mold cavities, each said mold cavity having an open side facing said fill slot to fill through said open sides of both said mold cavities when the mold plate is in said fill position.

23. A food product proportioning apparatus according to claim 22, comprising a stationary fill block within said fill slot, said fill block having a multiplicity of fill paths distributed in a predetermined pattern throughout an area aligned with the open sides of the mold cavities when the mold plate is in its fill position, said fill paths each having a change in direction of about 90 degrees to fill through the open sides of the mold cavities when the mold plate is in said fill position.

24. A food product proportioning apparatus according to claim 23, comprising a fill plate between said stripper plate and said fill block, said fill block mounted to said fill plate, said fill plate having at least one opening to allow food product to pass between said fill passage and said fill block.

* * * * *